CLEVELAND & JOHNSTON.
Flat Iron Heater.
No. 13,566.
Patented Sept. 18, 1855.
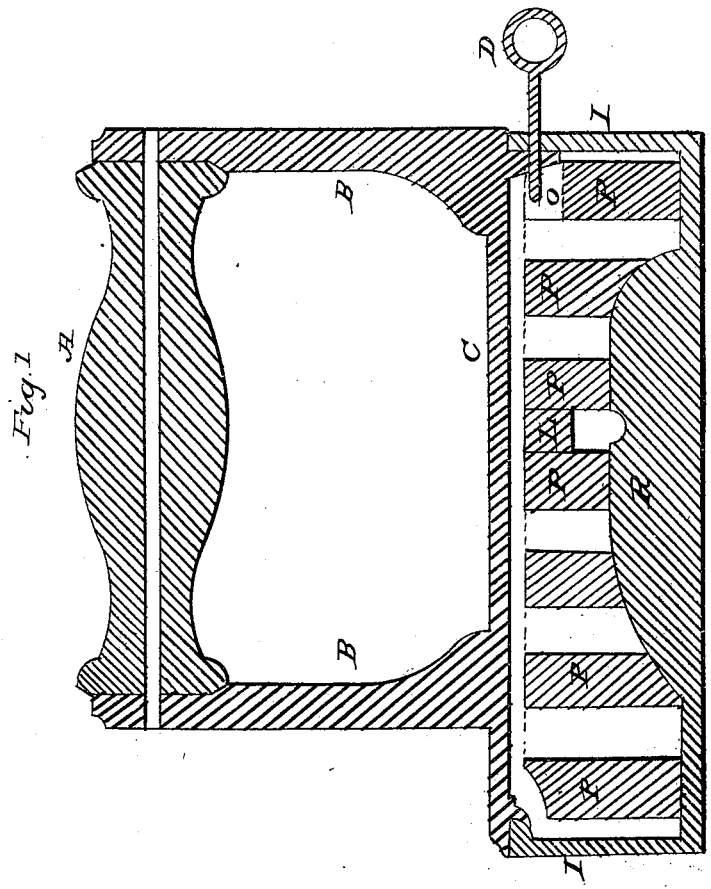
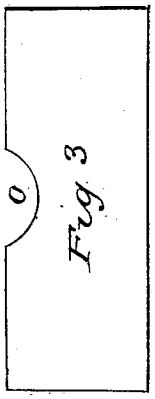
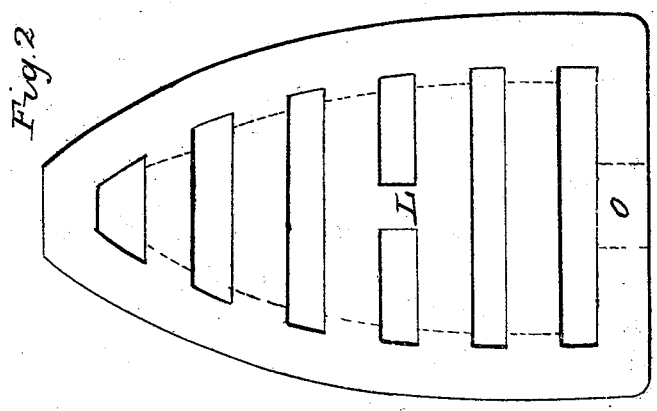

UNITED STATES PATENT OFFICE.

NEWELL CLEVELAND AND JAS. J. JOHNSTON, OF ALLEGHENY, PENNSYLVANIA.

HEATER FOR SMOOTHING-IRONS.

Specification of Letters Patent No. 13,566, dated September 18, 1855.

*To all whom it may concern:*

Be it known that we, NEWELL CLEVELAND and JAMES J. JOHNSTON, of the city and county of Allegheny, State of Pennsylvania, have invented a new and Improved Heater for Box Smoothing-Irons; and we do hereby declare the following to be a full, clear, and exact description thereof, reference being had to the accompanying drawings, and to the letters of reference marked thereon, in which—

Figure 1, is a central section lengthwise of a complete box smoothing iron, Fig. 2 is a top view of the heater, Fig. 3 is an end view of the heater at its largest end.

The nature of our invention consists of a grated heater which provides for the expansion, incrustation, and affords a facility in heating the heater. Solid heaters expand from the center outward and by repeated heating scales are formed upon the surface which scales cannot be readily removed. Such heaters heat and cool too slowly to throw off the incrustation. Hence the heater becomes too large for the box of the smoothing irons.

The object of our invention is to overcome these difficulties, which we do by making a grated or lattice worked heater between the bars of which the fire can readily pass as through so many flues and at the same time the scales forming upon the surfaces of the heater are thrown off better than in a solid heater.

In the accompanying drawings (Figure 1) A is a wooden handle, B is the supports for the handle A. C is the lid secured to the box in the usual way by dovetail at the front (or point) end and by pin D at the lug on the underside of the lid at the butt (or largest) end of the iron, I is the box of the iron, R is a raised mass in the center of the box of the iron, (P, P, P,) are the bars of the heater running transversely thereof, L is a bar connecting two transverse bars about the middle the heater so as to lift it thereby. O is a depression in the butt end of the heater to allow room for the lug of lid and the pin D.

Fig. 2, which is a top view of the heater, L is a bar which connects to other bars which run transversely and is used in lifting the heater in and out of the iron, O is the depression for the lug and pin.

Fig. 3 is an end view of the heater. O is the depression for lug on the lid and the pin D.

The advantages of our improvement in heaters is as follows: The heat is more readily diffused through the mass of the heater by means of the lattice work, and we have not to burn the outer surfaces of our heater (and thereby form scales) before the central mass is sufficiently heated for use. Our heater expands toward the center of the openings. Hence our heater never becomes too large for the box of the iron, and the sudden heating and cooling of our heater throws off the scales which may happen to form on the bars, or surfaces of the heater. Our heater never dampens the fire as the openings act as so many flues for the fire to pass through.

What we claim therefore as our invention and desire to secure by Letters Patent is—

The grated (or lattice worked) heater for box smoothing irons substantially as described and represented.

NEWELL CLEVELAND.
JAMES J. JOHNSTON.

Witnesses:
ALEX. HAYS,
GEORGE HUTCHISON.